Patented Apr. 26, 1938

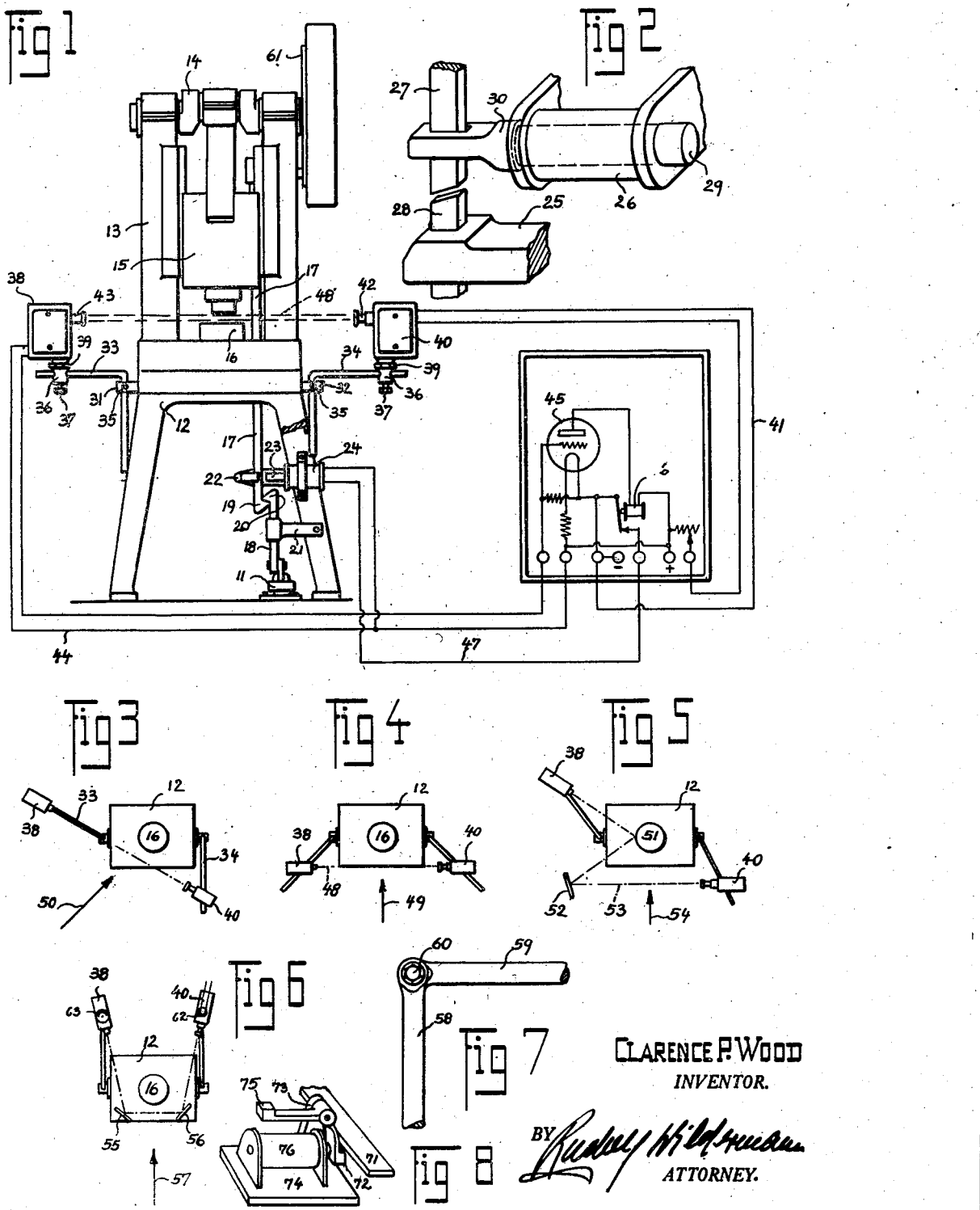

2,115,322

UNITED STATES PATENT OFFICE 2,115,322

PHOTOELECTRIC SAFETY GUARD

Clarence P. Wood, New York, N. Y., assignor to Polymet Manufacturing Corporation, New York, N. Y., a corporation of Delaware Application January 22, 1934, Serial No. 707,858

1 Claim. (Cl. 192—130)

This invention relates to a device guarding machinery and more particularly it concerns the arrangement of photo-electric means in connection with and in relation to moving parts of machinery in such a manner that the said means prevent mishaps and accidents and/or draw the attention of the operator to faulty action of machines.

Devices serving to protect machinery in operation, or to protect attendants and operators from being harmed by machines, have in the past been built on the principle of preventing access to the machine, or to the dangerous parts thereof. This has been elaborated and in some instances the devices actually remove undesirable parts or push an operator or by-stander out of the danger zone.

In all devices of this kind, the protective means—, being prominently placed by virtue of being guards,—render difficult observation of the work to be done and being done; they make it difficult for the operator to set his machine and in many instances, instead of preventing accidents, they are contributing to trouble.

Other protective devices provide for means which engage the operator or his hands at a point removed from the danger zone while a dangerous operation is being performed; i. e., the machine will not function until the operator actuates a certain release control, which will function as long as he engages that release. Such protective means would not protect another party although the operator may be actuating the release and furthermore the operator is prevented from performing useful work, preparing for instance for the next operation, while a certain operation is being performed. Such protective devices for that reason impair efficiency and retard production in the same manner in which the first mentioned kind of protective means is an encumbrance.

It has been an object of this invention to provide protective means which protect the danger zone but which do not physically obstruct access to that zone at any time, nor in any manner.

It is another object of this invention to provide protective means which may readily be arranged at will, so that for a certain operation the particular point of direction of danger is duly guarded.

It is still another object of this invention to provide guard means which do not obstruct vision and which in no manner obstruct access during operation, but which instantaneously intercept the operation, when something goes wrong or an operator, or any other person, or even any object enters upon the danger zone.

This invention provides furthermore for guard means which at the same time may be converted for checking on the quality of work, and to ascertain the proper positioning of work and due performance generally.

Other advantages of this invention will be brought forth and more clearly understood from the following description and the accompanying drawing, in which Fig. 1 shows an elevation of a machine to be protected, for instance a power or punch press, on which guard means of my invention are mounted, together with an electric wiring diagram illustrating the functioning of my protective means.

Whereas Fig. 1 shows an exemplary application of my invention in connection with an operation in which the machine is actuated by the pulling of a lever, Fig. 2 shows in a perspective detail view a modification in which the actuating lever is pushed.

Figs. 3, 4, 5 and 6 indicate, by means of schematic top views of a machine of the kind shown in Fig. 1, the adaptability of my improvements for various classes of work, the application of mirrors and also for checking the work being done.

Fig. 7 shows a modification of a supporting bracket which may be substituted for one or the other supporting bracket of Fig. 1.

Fig. 8 shows in a perspective view a modification of part of my invention which controls the operation of a machine.

The protective means of my invention comprise a photo-electric element and for that reason the control of operations must be brought about directly or indirectly by way of electrical circuits.

By those acquainted with the mechanical and electrical arts, it will be clearly understood that wherever an electrical motor or device actuates a machine or is to be controlled, the arrangement of the photo-electric means of the example hereinafter set forth may be readily applied, the photo-electric currents, which are set up during the process of applying protection, being readily converted by way of auxiliary circuits, amplifiers and relays, for the purpose of breaking the circuit exciting the motor or other devices. Electromagnetic clutches, as also well known in the arts, may be inserted at a preferred point in machinery or of the transmission of machinery and the current of such devices is subjected to control by photo-electric currents set up in accordance with the operation of the protective means described in the following. The adaptation of my invention for all such purposes will be readily understood by engineers and machine builders and for that reason the showing of the accompanying drawing in respect to stopping the operation of machinery is limited to a specific instance, to wit, the control of levers which start and stop a press.

Most power presses are controlled by a pedal such as indicated in Fig. 1 at 11 in relation to the press 12, in which the frame 13 supports the revolving crank shaft 14, and the reciprocating ram 15 coacts with the stationary die 16.

As well known to those acquainted with press design, presses ordinarily have clutches which start the crank on an operating stroke after a foot pedal 11 is pushed down. When the foot pedal 11 is released, the press mechanism comes to a stop after the stroke which is being performed.

The clutch of such an apparatus is ordinarily actuated by means of a rod connecting the clutch mechanism with the pedal 11. For the purpose of this invention such a rod is divided into two parts, an upper rod 17 connecting to the clutch mechanism 61 and a lower rod 18 connecting to the pedal 11, the ends of said rods being hook-shaped as shown at 19 and 20, respectively, abutting upon each other at slanted faces. The lower rod 18 is guided in a bracket 21 so that it will reciprocate down and up when actuated by the foot pedal; the upper rod 17 is retained in a hook-shaped bracket 22, and slidingly abuts upon the end of the core 23 of an electro-magnet 24, when said electro-magnet is actuated. But when said electro-magnet is not excited and releases rod 17, said rod may shift away from the end of core 23 to the left by a lowering of rod 18, so that the hooked ends 19 and 20 of rods 17 and 18 disengage from each other. It is therefore understood that the rods 17 and 18 act like one rod, in unison, as long as the electro-magnet 24 is excited. But when the electro-magnet 24 is not excited, the rod 17 will not be pulled down by the rod 18 when the latter is pushed down by actuation of the foot pedal but the hooks 19 and 20 will slide off each other and the rod 17 will be released, so that the machine is not actuated regardless of whether or not the foot pedal 11 is actuated. But when the electro-magnet 24 is excited and the foot pedal is pushed down, the rod 17 will follow the downward movement of rod 18, and will actuate the clutch mechanism, and the clutch mechanism will remain actuated while the electro-magnet is excited as long as a treadle 11 is actuated.

Whereas in the arrangement shown in Fig. 1 the clutch mechanism is actuated by pulling down rod 17, there is also machinery in which a treadle pushes up a rod which actuates a clutch, for instance the clutch mechanism of a press. In such an instance the two sections 17 and 18 of the showing of Fig. 1 are replaced by rods 27 and 28 of Fig. 2, which coact as long as they abut end to end. Analogously to the arrangement of Fig. 1, the lower rod 28 is guided along a vertical path by a bracket 25. Above bracket 25 a solenoid 26 is stationarily mounted, in which is horizontally slidably disposed a core piece 29. Through a suitable opening in the head 30, which is at one end of core piece 29, slidably extends upper rod 27. When the solenoid 26 is excited, the core piece 29 is pulled thereinto so that the head 30 abuts upon the left end of the solenoid and rods 27 and 28 are retained in alignment, so that the rod 27 is pushed up when 28 is raised by a foot pedal in order to actuate the clutch mechanism; rod 27 gravitationally follows the rod 28 down, when the latter is released and lowers. But the faces at which the rods 27 and 28 abut upon each other are slanted; and as long as the solenoid 26 is not excited, the rod 27 will slide off the rod 28 to the left, pulling the core piece 29 out of the solenoid 26, when the rod 28 is raised by actuation of the pedal. In a manner correspoding to that of the arrangement of Fig. 1, the clutch mechanism will be released when the solenoid 26 is not actuated. As much as the clutch mechanism of Fig. 1, cannot be actuated as long as electro-magnet 24 is not excited, a clutch connected to rod 27 of Fig. 2 cannot be actuated or is released, as long as solenoid 26 is not actuated or when it is de-energized.

Therefore a control of the electro-magnet 24 or of the solenoid 26 will protect a machine and prevent its operation, as long as these electric devices are not excited. The control of electro-magnet 24 is brought about as follows:—

From opposite sides of the frame 13 of the press extend brackets or ears 31 and 32. Through suitable vertical guide openings in these ears extend the vertical legs of swing brackets 33 and 34 respectively, and the said screws 35 and 36 serve to set the said swing brackets in any preferred angular position or at any height.

On the horizontal arm of swing bracket 33 is mounted a swivel, which may be set by set screw 37 at any point of the extent thereof. The swivel 36 supports the photo-electric box 38, which may be set by collar 39 at any preferred angle, as known to those acquainted with the mechanical arts. Upon the horizontal arm of the other swinging bracket 24, a similar swivel 36 is mounted, which in like manner supports a projector box 40. By way of circuit 41, for instance a flexible conduit, a bulb (not shown) in the projector box 40 is lit and the projector piece 42 projects a beam of the light of said bulb towards and into the tube 43 extending from the photo-electric box 38.

By reason of the adjustable mountings of the boxes 38 and 40 they may always be arranged in alignment so that the beam projected through projector piece 42 from box 40 enters through tube 43 into box 48, where it strikes a photo-electric cell of the common construction (not shown).

The photo-electric cell is connected by means of a circuit 44 to means actuating directly or indirectly the electro-magnet 24. In the drawing the photo-electric circuit comprises for purposes of amplification the triode 45 and the amplified current excites a relay 46. In other words, as long as a light beam is projected from box 40 onto the photo-electric cell of box 38, the relay 46 is closed and closes the circuit 47 of electric magnet 34 so that the latter is excited.

It will be noticed that the beam projected from box 40 to box 38 and exemplarily indicated by dotted lines 48, passes directly in front of the level at which the upper die carried by the ram 15 coacts with the lower die 16, and may be arranged more or less close thereto. This arrangement may readily be understood from Fig. 4. If any person approaches the dies in the direction of arrow 49, i. e., said person or for instance his or her hand intercepts the beam 48 and the photo-electric current flowing through circuit 44 is decreased to such an extent that there is not sufficient amplified current to actuate relay 46, so that the current of electro-magnet 44 is broken and the operation of the press is interrupted or the press cannot be actuated even though such actuation may be attempted by operating pedal 11.

Fig. 3 shows the manner in which the brackets 33 and 34 may be shifted in order to bring the boxes 38 and 40 into a different alignment which is preferred in case the operator approaches the press in the direction indicated by arrow 50. Other angular arrangements suggest themselves.

If the piece of work 51 to be handled in the press is of such properties that it reffects light, the boxes 38 and 40 may be arranged in the manner there shown, so that the light projected from box 40 is reflected by a mirror 52 onto the piece 51 and then reflected into the box 38. As long as the piece of work 51 is not properly positioned the light beam sent out from box 40 will not reach box 38 so that the machine cannot be operated. At the same time the extent of the beam, which is disposed in the front of piece 51 and which is identified by the numeral 53 serves for protection inasmuch as it will be intercepted by any physical approach in the direction of the arrow 54.

The manner in which the die 16 may be guarded against approach from a plurality of sides is indicated in Fig. 6, where the mirrors 55 and 56 direct the beam passing from bulb 62 in box 40 to cell 63 in box 38 around three sides of the machine, so that the photo-electric means do not only protect against approach in the direction of arrow 57, but also against approach from the sides.

In case the arrangement of Fig. 5 is used, or in other instances, where it is advisable to project the light beam at an incline, universal joints may be used in connection with brackets 33 and 34 and swivels 36. Thus the brackets 33 and 34 may be executed in the manner indicated in Fig. 7, in which the two arms 58 and 59 of the bracket are hinged together and fastened upon each other by a screw 60, so that they may be set at any preferred angle in relation to each other. Thus a beam may be reflected by the top face of the die or of a piece of work, or the beam may be passed between two mirrors in zig-zag back and forth, forming an invisible protective screen or trellis, as known from other applications of photo-electric cells.

Whereas a stop and release mechanism according to the showing of Figs. 1 and 2 of the drawing requires certain changes and rearrangements in the machinery to which my improvements are applied, it may also be desirable to provide my invention in such form, that it may be set up in connection with machines, without altering their construction at all.

It is readily understood that the optical parts, the projector and the radiant energy sensitive cell, may be set up independent of the machine to be guarded. There are machines which require actuation by the operator for each operation. For instance, many presses need actuation of a pedal for each cycle of operations. Such a pedal 71 which must be depressed for each operative cycle is indicated in Fig. 8. The pedal 71 can normally not be depressed and the respective machine is therefore rendered inoperative, as long as latch 72 hooks underneath the pedal 71, said latch depending from a stand 73 mounted on base 74, and being tensioned in counterclockwise direction by the counterweight 75, which is part of the latch and extends to the left from the fulcrum of the latch. But the pedal may be operated, when electromagnet 76 is energized and attracts latch 72 which in turn releases the pedal 71.

A unit contained on base 74 may readily be set up in operative alignment with any foot-operated device and, modified within the knowledge of machine designers, with any device actuated by an operator.

Radiant energy sensitive elements are frequently accommodated in housings which admit a narrow beam approaching the housing in one particular direction. Such units are readily obtainable in the market and when such a unit is used, I may dispense with the projector 40, provided a sufficiently strong beam of radiant energy,—for instance, daylight entering through a window or the light of an electric bulb,—approaches said unit in the particular direction in which a light beam can be admitted.

Within the terminology used in the arts related to the subject matter of this invention, the term photo-electric or photo cell, element or tube comprises any device sensitive to radiant energy and reacting upon a predetermined irradiation in a manner permitting transmission of corresponding control impulses.

Although I have shown and described one form of embodiment of my invention in detail, yet I do not wish to be limited thereby, except as the state of the art and the appended claim may require, for it is obvious that various modifications and changes may be made in the form of embodiment of my invention, without departing from the spirit and scope thereof.

I claim:

A safety guard protecting the operation of parts on a machine, comprising a lever controlling said operation, rods connecting said lever with said machine, an electromagnetic device operatively aligning said rods when excited, a radiant energy sensitive cell, means shielding said cell but admitting a beam of radiant energy passing said parts to said cell, and a means operatively connecting said cell and said device so that said device is excited as long as said beam irradiates said cell.

CLARENCE P. WOOD.